United States Patent
Landry et al.

(10) Patent No.: US 10,607,104 B1
(45) Date of Patent: Mar. 31, 2020

(54) SYSTEM AND METHOD FOR DETECTING DAYTIME SOLAR GLINT USING MULTI-BAND MID-WAVE INFRARED IMAGERY

(71) Applicant: Raytheon Company, Waltham, MA (US)

(72) Inventors: Joseph C. Landry, Waltham, MA (US); John J. Coogan, Waltham, MA (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 16/263,482

(22) Filed: Jan. 31, 2019

(51) Int. Cl.
| | | |
|---|---|---|
| *H04N 5/33* | (2006.01) | |
| *H04N 7/18* | (2006.01) | |
| *G06K 9/46* | (2006.01) | |
| *G01J 5/00* | (2006.01) | |
| *G06K 9/62* | (2006.01) | |

(52) U.S. Cl.
CPC .......... *G06K 9/4661* (2013.01); *G01J 5/0066* (2013.01); *G06K 9/6202* (2013.01); *H04N 5/33* (2013.01); *G01J 2005/0077* (2013.01)

(58) Field of Classification Search
CPC .. G01J 2005/0077; G01J 5/0066; H04N 5/33; H04N 7/18; G06K 9/4661; G06K 9/6202
USPC .......... 348/162–165; 250/336.1, 330, 338.1, 250/338.3, 339.03, 339.04
See application file for complete search history.

(56) References Cited

U.S. PATENT DOCUMENTS

| 5,682,035 A * | 10/1997 | Gallagher ................ H04N 5/33 348/164 |
| 2016/0202126 A1* | 7/2016 | Schmidt ................ G01J 5/0066 250/342 |
| 2018/0109740 A1* | 4/2018 | Pickett ..................... H04N 5/33 |

OTHER PUBLICATIONS

Allison et al.; Airborne Optical and Thermal Remote Sensing for Wildfire Detection and Monitoring—Sensors; published Aug. 18, 2016—29 pages.
Giglio et al.; Active fire detection and characterization with the advanced spaceborne thermal emission and reflection radiometer (ASTER); Remote Sensing of Environment 112 (2008).
Ortega-Terol et al.; Automatic Hotspot and Sun Glint Detection in UAV Multispectrical Images; Senors; published Oct. 15, 2017.

* cited by examiner

*Primary Examiner* — Sherrie Hsia
(74) *Attorney, Agent, or Firm* — Burns & Levinson, LLP; Joseph M. Maraia (57) ABSTRACT

A system and method for processing a daytime IR image to discriminate between solar glints and hotspots, where the latter represent man-made activity. Two spectrally distinct thermal wavelength bands are defined and respective spectral intensities are detected for a corresponding pixel in an image. A figure of merit is calculated as a function of the detected spectral intensities. The calculated figure of merit is compared to a predetermined rule to determine whether the corresponding pixel is a glint or a hotspot.

20 Claims, 7 Drawing Sheets

SYSTEM AND METHOD FOR DETECTING DAYTIME SOLAR GLINT USING MULTI-BAND MID-WAVE INFRARED IMAGERY

GOVERNMENT RIGHTS

This invention was made with Government support under contract HM047617D0015/HM047617F0365. The Government has certain rights in the invention.

FIELD OF THE DISCLOSURE

The disclosure relates, generally, to infrared image processing to distinguish sunlight reflections from hot spots that indicate human activity.

BACKGROUND

Thermal infrared imagery is used to find hot spots that indicate human activity. During the daytime, however, these thermal hotspots are easily confused with solar reflections, i.e., glints, from shiny surfaces. Shiny targets look hot in the infrared (IR) spectrum during the daytime because they are directly reflecting sunlight into the camera or sensor. When trying to find hot targets in daytime infrared imagery, however, the glints or specularly reflected sunlight make ambient targets falsely appear hot. It is, therefore, necessary to discriminate between solar glints and thermally active, or hot, areas in order to detect human activity.

In a known approach, glints are differentiated from hot spots by a human, i.e., an image analyst, who uses prior knowledge and context to distinguish ambient targets that are glinting from hot targets. This approach requires special training because the phenomenology of thermal imagery is unfamiliar to the average analyst.

In another approach, glints are differentiated from hot spots by machines using polarization and geometry. The polarization approach, however, requires complicated hardware. The geometric approach assumes a flat world, i.e., it cannot work on tilted targets, and, therefore, is not particularly effective as most of the world is not flat[1].

[1] The views of the Flat Earth Society notwithstanding.

Another approach is to avoid solar reflections altogether by obtaining IR images at night, leading to very limited opportunities to obtain image information.

A system to distinguish glints from hot spots that is operable during the day is needed.

SUMMARY OF THE INVENTION

In one aspect of the present disclosure there is a system for distinguishing a solar glint from a thermal hot spot in an IR image, comprising: at least one processor configured to: receive a frame of a captured IR image, the frame comprising at least one pixel and associated data, the associated data comprising first and second radiance values (R1, R2) corresponding, respectively, to first and second bands of wavelengths of the IR spectrum; and for each at least one pixel in the received frame: calculate a figure of merit (FoM) as a function of the first and second radiance values, FoM=f(R1, R2); apply a predetermined rule to the calculated figure of merit (FoM) to identify the pixel as a solar glint or a thermal hot spot; mark the pixel as one of a solar glint or a thermal spot as a result of the application of the predetermined rule; and display the pixel in accordance with its mark as a solar glint or a thermal hot spot.

In another aspect of the present disclosure, there is a computer-implemented method of distinguishing a solar glint from a thermal hot spot in an IR image, the method comprising: receiving, at a processor, a frame of a captured IR image, the frame comprising at least one pixel and associated data, the associated data comprising first and second radiance values (R1, R2) corresponding, respectively, to first and second bands of wavelengths of the IR spectrum; and for each at least one pixel in the received frame: calculating, using the processor, a figure of merit (FoM) as a function of the first and second radiance values, FoM=f(R1, R2); applying, using the processor, a predetermined rule to the calculated figure of merit (FoM) to identify the pixel as a solar glint or a thermal hot spot; marking, using the processor, the pixel as one of a solar glint or a thermal spot as a result of the application of the predetermined rule; and displaying, using the processor, the pixel in accordance with its mark as a solar glint or a thermal hot spot.

BRIEF DESCRIPTION OF THE DRAWINGS

Various aspects of the disclosure are discussed herein with reference to the accompanying Figures. It will be appreciated that for simplicity and clarity of illustration, elements shown in the drawings have not necessarily been drawn accurately or to scale. For example, the dimensions of some of the elements may be exaggerated relative to other elements for clarity or several physical components may be included in one functional block or element. Further, where considered appropriate, reference numerals may be repeated among the drawings to indicate corresponding or analogous elements. For purposes of clarity, however, not every component may be labeled in every drawing. The Figures are provided for the purposes of illustration and explanation and are not intended as a definition of the limits of the disclosure. In the Figures.

DETAILED DESCRIPTION

In the following detailed description, details are set forth in order to provide a thorough understanding of the aspects of the disclosure. It will be understood by those of ordinary skill in the art that these may be practiced without some of these specific details. In other instances, well-known methods, procedures, components and structures may not have been described in detail so as not to obscure the aspects of the disclosure.

It is to be understood that the present disclosure is not limited in its application to the details of construction and the arrangement of the components or steps set forth in the following description or illustrated in the drawings as it is capable of implementations or of being practiced or carried out in various ways. Also, it is to be understood that the phraseology and terminology employed herein are for description only and should not be regarded as limiting.

Certain features are, for clarity, described in the context of separate implementations, and may also be provided in combination in a single implementation. Conversely, various features, that are, for brevity, described in the context of a single implementation, may also be provided separately or in any suitable sub-combination.

Figure 1:
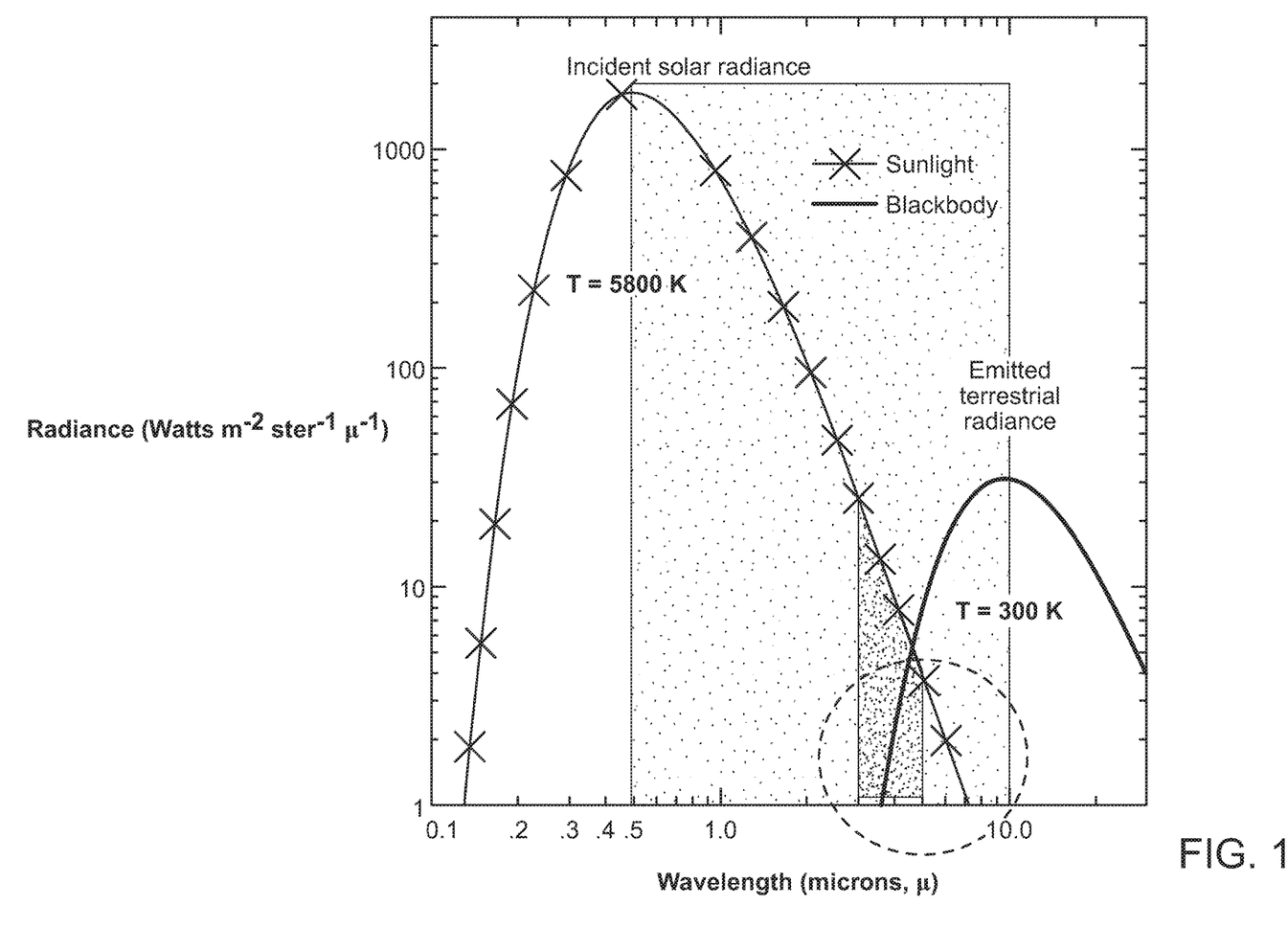
FIG. 1 is a graph of solar vs terrestrial radiance.

Referring now to FIG. 1, as is known, solar emissions, at ~6000 K, have a radiance level that peaks at a wavelength in the visible band or range (~0.5 µm), while a typical terrestrial thermal target, at <500 K, has a radiance level that peaks at a wavelength in the long wave infrared range (~10 µm). Furthermore, in the long-wave, mid-wave and short-wave infrared regions, where a thermal image is usually acquired, the solar spectrum radiance intensity is decreasing with increasing wavelength, while a thermal emission spectrum radiance intensity is increasing or slowly changing with increasing wavelength.

Aspects of the present disclosure are based on the spectral differences between reflected sunlight, i.e., a glint, and terrestrial, i.e., man-made, thermal emissions in a region of, generally, 0.5-10 µm, or more specifically, in some aspects of the present disclosure, in the range of 1-10 µm of the IR. This is the range where solar radiance is decreasing with wavelength and terrestrial radiance is increasing with wavelength. These spectral differences are used to discriminate between hot targets (man-made) and glinting targets (reflections) in IR thermal imagery. In other words, a multi-band IR image collection system in accordance with an aspect of the present disclosure can operate to discriminate between reflected solar radiation and man-made thermal activity.

Figure 2:
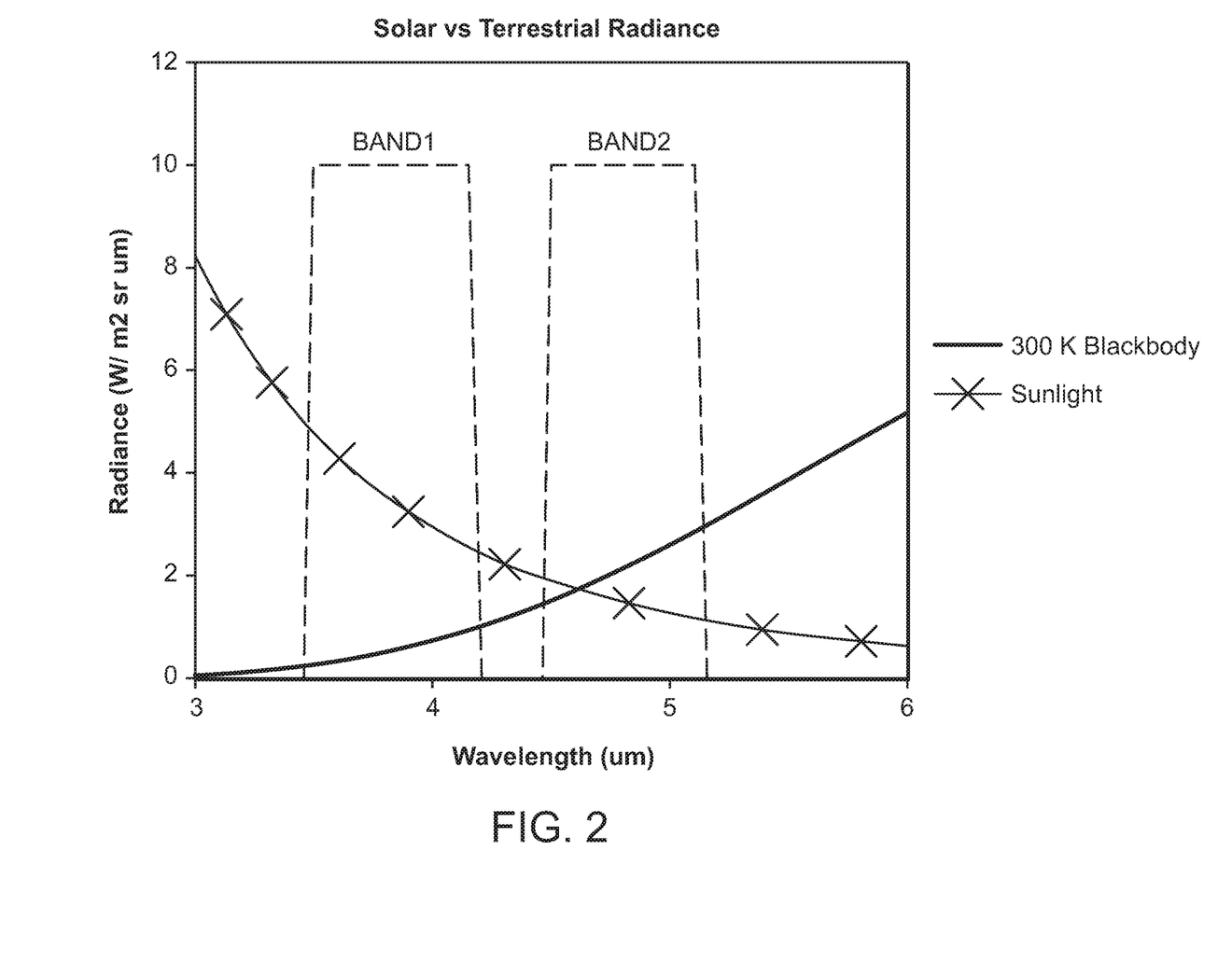
FIG. 2 is a conceptual representation in accordance with an aspect of the present disclosure.

Generally, referring now to FIG. 2, which is a magnified portion of the graph of FIG. 1, two different wavelength bands, Band1 and Band2 implemented, in one non-limiting example, by a bandpass Filter1 and a bandpass Filter2, respectively, are defined. It should be noted that the bands need not be symmetric nor the same width as the example shown in FIG. 2. The two bands may have different shapes or widths and may include asymmetric spectral responses. Accordingly, the band passes need not be carefully built.

Further, in another aspect of the present disclosure, the bands can be optimized to increase the corresponding spectral response for the band that has a lower expected signal. Alternatively, a band pass could be placed where the atmosphere is especially transparent, e.g. at 1.6 µm or from 8 to 9 µm.

Respective signals from each band are captured and analyzed. In one aspect, the signals are compared to one another to determine if a corresponding pixel in an IR image is representative of a glinting target (not human activity) or a hot target representing human activity. Reflected sunlight, i.e., a glint, will have a stronger radiance signal in the wavelength range of Band1 while a terrestrial emission, i.e., a hot target representing man-made activity, will have a stronger radiance signal in the wavelength range of Band2. The ranges of Band1 and Band2 are chosen to not overlap with one another in one aspect of the present disclosure. Although not optimal, the Band1 and Band2 ranges may be configured to overlap with one another if the associated diminishment of performance is acceptable. For purposes of explaining aspects of the present disclosure, and not intended to be limiting, the wavelength values in the range of Band1 are less than those in the range of Band2.

It should be noted that a "radiance signal" can be one of a number of measurements and still be in accord with the teachings herein. For example, but not meant to be limiting, there is the target radiance that is a function of wavelength and there is the signal measured by the sensor that integrates collected energy over the sensor's band pass range.

Figure 3:
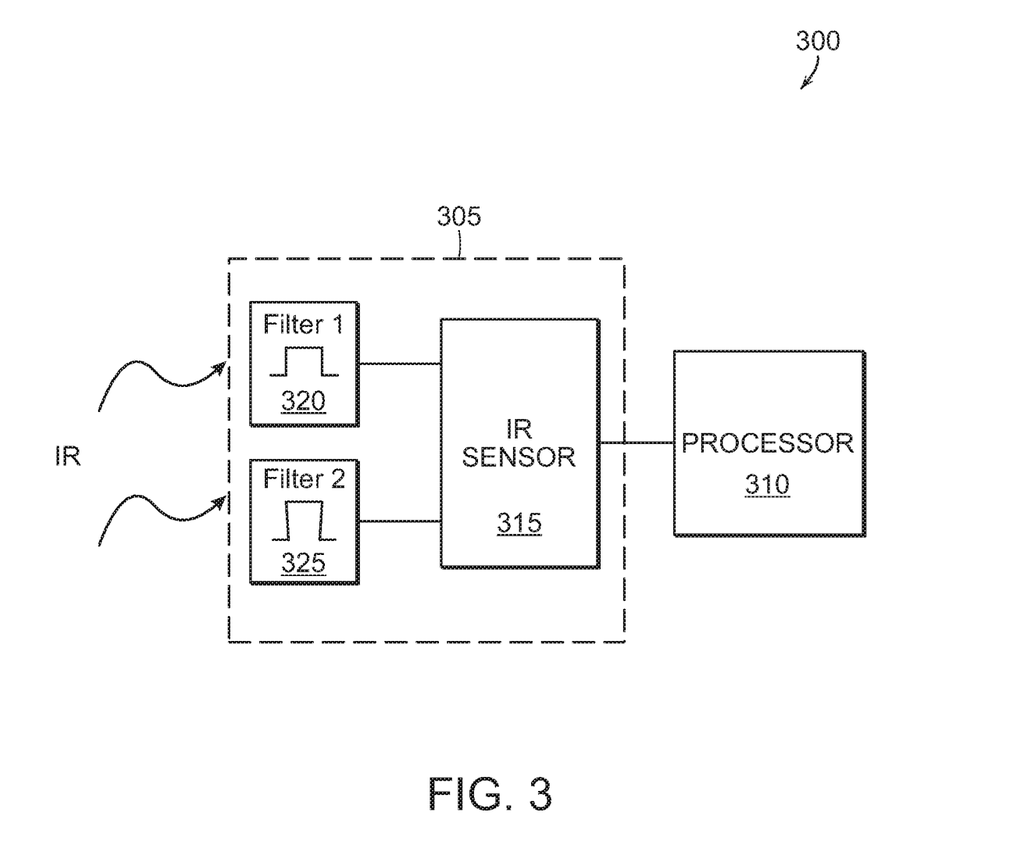
FIG. 3 is a block diagram of a system in accordance with an aspect of the present disclosure.

A system 300 for differentiating a glint from a hot target, as shown in FIG. 3, includes an IR camera 305 for detecting an IR image coupled to a processor 310. The IR camera 305 includes an IR sensor 315 coupled to two bandpass filters 320, 325 corresponding to the bands Band1, Band2 in FIG. 2. One of ordinary skill in the art understands that different techniques are available to capture an IR image at different wavelengths.

In one approach, an IR sensor is provided with a bandpass filter that selective passes a band of wavelengths of IR radiation. The IR sensor may be a 2D array or a 1D linear array. Where relatively large overhead imagers are provided, e.g., those used for commercial and research earth observation, several linear arrays are provided—each one with a different band-pass filter. Over time, each linear array scans the area of interest, for example, the ground, sampling the radiance within the wavelength range passed by the band-pass filter and a multi-band image is then generated.

In another technique for capturing an IR image at different wavelengths, a dispersion element, e.g., a prism or grating, is used to separate the incoming light by wavelength, and a number of sensors are placed in positions to collect light at a desired wavelength or a band of wavelengths. Further, instead of band pass filters, two different IR sensors that have fundamentally different spectral responses, e.g., a Quantum Well Infrared Photodetector (QWIP) where each may be designed to be selectively sensitive to a predefined wavelength band.

The type of sensor/system used to gather the IR imagery are not germane to the novel and non-obvious approaches to identifying glint in an IR image, per the aspects of the present disclosure described herein.

Further, in another aspect of the present disclosure, a system is implemented where each of R1 and R2 is measurable using a same focal plane, i.e., in a same optical path. That is, a difference in wavelength between R1 and R2 is small enough that each can be measured using the same hardware. This approach provides an advantage over a system that would require that R1 and R2 be separated by a wide spectral range, e.g., R1 is in the visible range and R2 is IR, that complicates the hardware by requiring that more than one focal plane or detector be used.

Figure 4:
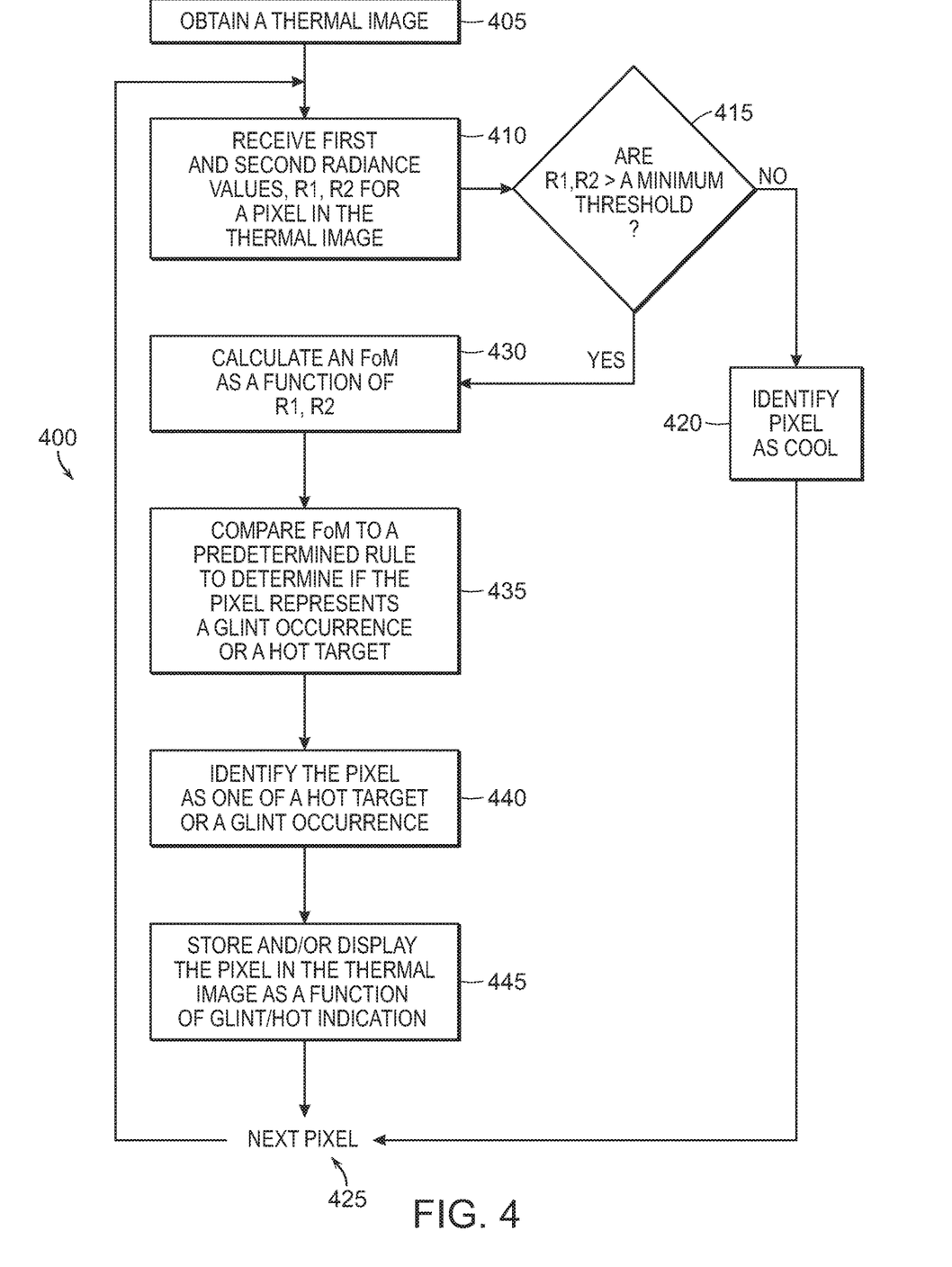
FIG. 4 is a flowchart of a method in accordance with an aspect of the present disclosure.

A method 400 of distinguishing a solar glint from a thermal hotspot in an IR image, in accordance with an aspect of the present disclosure, is set forth in FIG. 4. Initially, step 405, a thermal image of a desired area is obtained. The thermal image may comprise multiple images of a same area but each image is for a corresponding band of IR wavelengths as provided by Filter1 and Filter2. First and second radiance values R1, R2 are identified from the thermal image data, corresponding to the wavelength bands of Band1, Band2, respectively, step 410. Subsequently, step 415, a determination is made as to whether the first and second radiance values R1, R2 are each greater than a predetermined threshold value. If not, control passes to step 420 where the pixel is identified as being "cool," i.e., neither a glint nor a thermal hotspot, and a next pixel is selected, step 425, for processing.

The determination in step 415 may be based on:
both of the first and second radiance values R1, R2 being greater than a same threshold;
each of them being greater than a respective threshold, where the thresholds are not the same;

at least one of them being greater than a predetermined threshold;

at least one of them being greater than a respective predetermined threshold, where the thresholds are not the same;

a difference between the first and second radiance values R1, R2 being greater than a predetermine threshold; or any combination of the foregoing.

If it is determined at step 415 that the first and second radiance values R1, R2 are greater than a minimum predetermined threshold, control passes to step 430 where a figure of merit (FoM), or index, is calculated as a function of the first and second radiance values R1, R2. In one aspect of the present disclosure, the figure of merit (FoM) is determined by:

$$\text{FoM}=(R1-R2) \quad \text{Eq. 1}$$

and in another aspect of the present disclosure, the figure of merit (FoM) is determined by:

$$\text{FoM}=(R1-R2)/(R1+R2) \quad \text{Eq. 2}$$

Once calculated, the figure of merit (FoM) is compared to a predetermined rule to determine if the corresponding pixel is to be identified as a glint or a thermal hot spot, step 435. As set forth above, a glint will have a stronger radiance signal in the wavelength range of Band1 while a hot target will have a stronger radiance signal in the wavelength range of Band2. Accordingly, if SV<0, according to either of Equations 1 or 2, the pixel will be identified as a glint, step 440, and then stored and/or displayed as such, step 445.

Of course, one of ordinary skill in the art will understand that if Equation 1 and the numerator in Equation 2 were reversed, i.e., (R2–R1), then a figure of merit (FoM)≥0 would be a glint. It should be noted that distinguishing a glint from a hot spot is not that R1 is necessarily greater than R2, but that the slopes of the radiance curves that R1 and R2 represent for a pixel are different for glints and hot spots. More specifically, that the slopes of the radiance curves that are sampled in each of R1, R2 are opposite of one another with the slope R1 being negative and the slope of R2 being positive.

Figure 7:
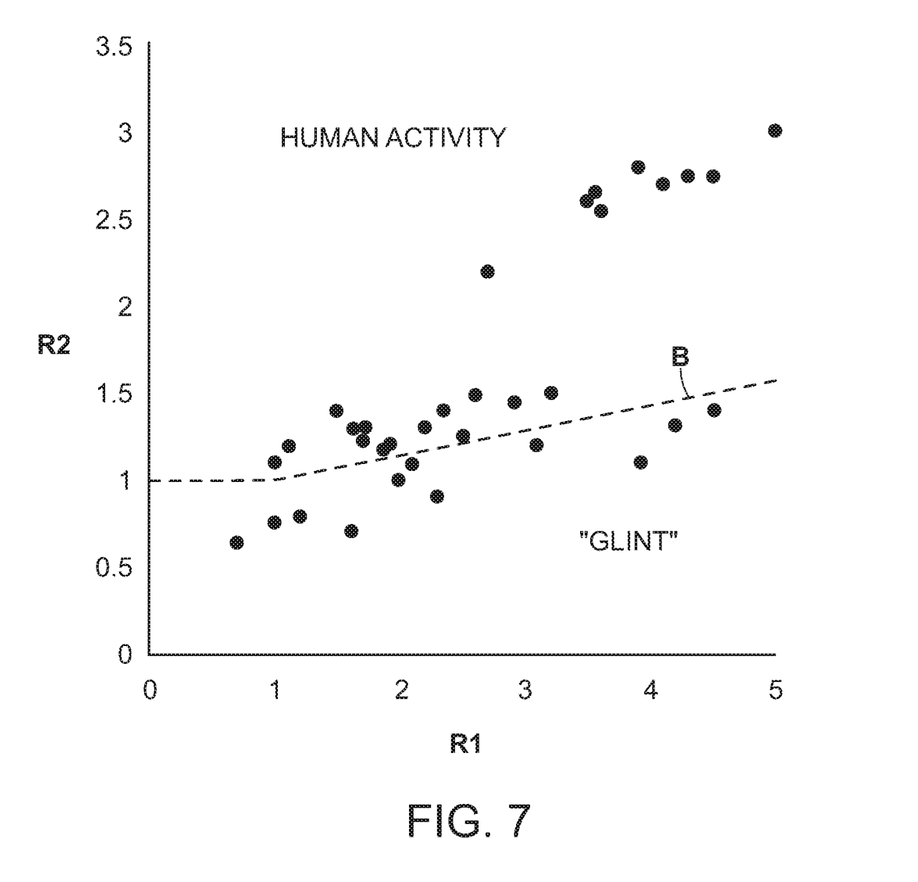
FIG. 7 represents another aspect of the present disclosure.

Further, referring to FIG. 7, a boundary line B can defined as:

$$B = \begin{cases} 1, & R1 \leq 1 \\ 3.5R1 - 2.5, & R1 > 1 \end{cases} \quad \text{Eq. 3}$$

where the point (R1, R2) is compared to the boundary line B and if the point is "below" the boundary line, the corresponding pixel is a glint, otherwise, it is a hot target.

Figure 5A:
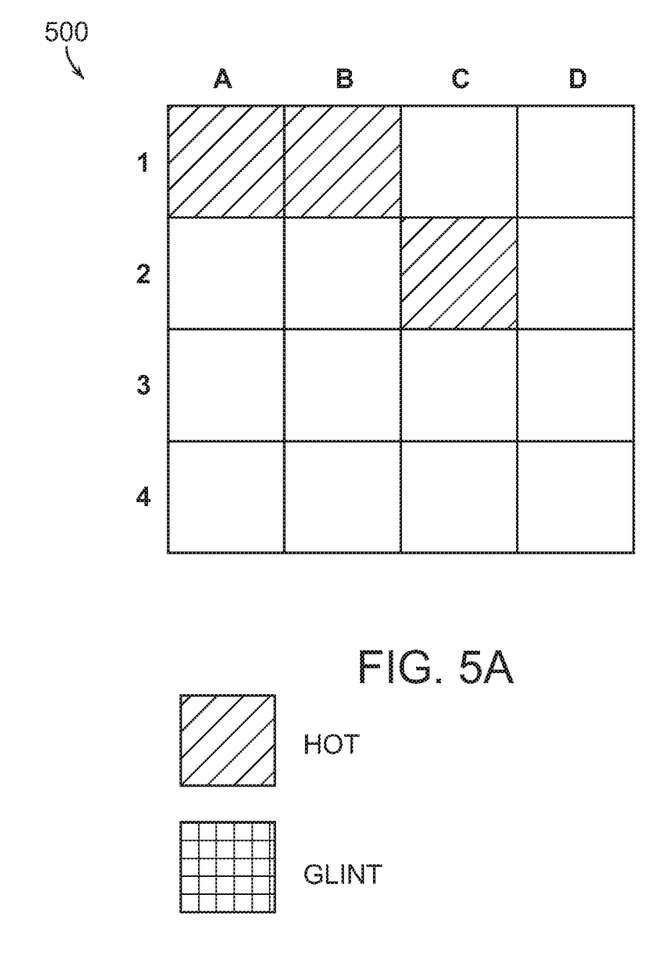
FIG. 5A represents one state of a display in accordance with an aspect of the present disclosure.
Figure 5B:
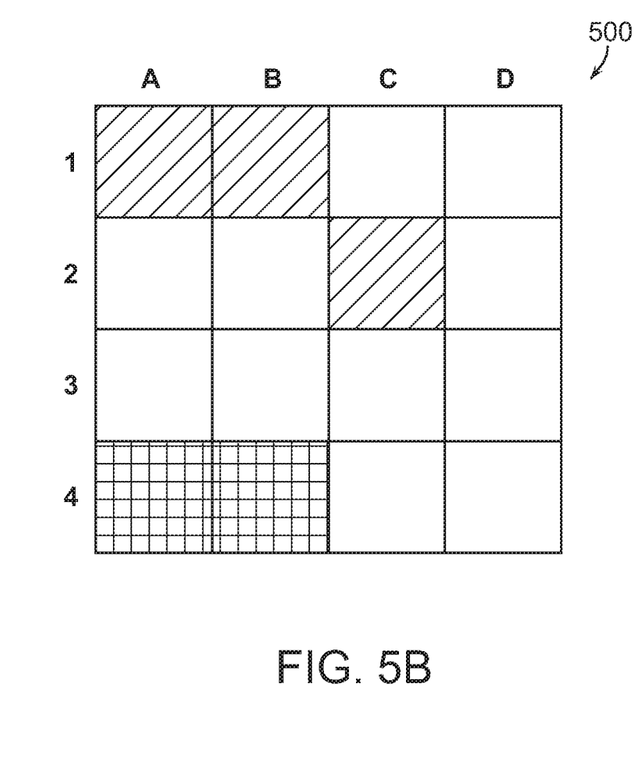
FIG. 5B represents another state of a display in accordance with an aspect of the present disclosure

Once all of the pixels in an image have been processed, a user of the present system could operate a display 500 to show just the hot pixels, FIG. 5A, or both hot and glint pixels, FIG. 5B.

Figure 6:
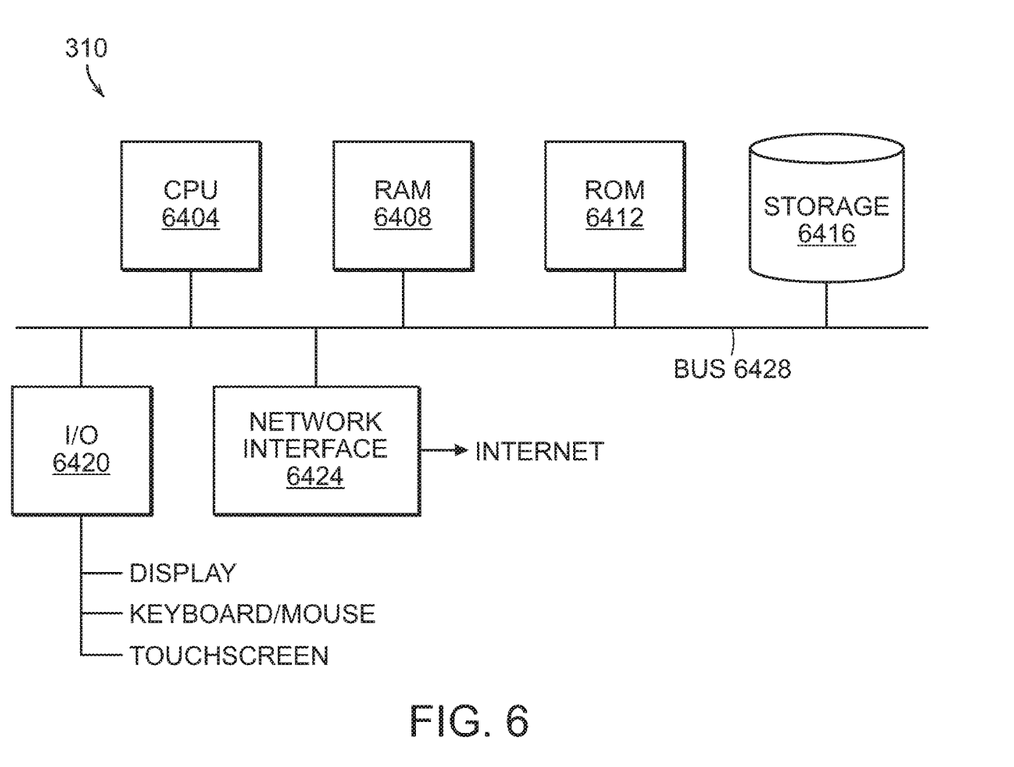
FIG. 6 is a block diagram of a processor implemented in a system in accordance with an aspect of the present disclosure.

Referring to FIG. 6, aspects of the present disclosure may be implemented on a processor 310 that may comprise a CPU 6404, RAM 6408, ROM 6412, a mass storage device 6416, for example, a disk drive, an I/O interface 6420 to couple to, for example, display, keyboard/mouse or touchscreen, or the like and a network interface module 6424 to connect to, either wirelessly or via a wired connection, to the Internet. All of these modules are in communication with each other through a bus 6428. The CPU 6404 executes an operating system to operate and communicate with these various components.

The first and second radiance values R1, R2 may be the "ground leaving radiance" or they may be processed based on one or more of viewing geometry, atmospheric conditions, etc., prior to a determination of the figure of merit (FoM). Thus, it is contemplated that any such "normalization" of the intensity or radiance values is accounted for when the figure of merit (FoM) is determined.

As set forth above, aspects of the present disclosure leverage the physics that the spectral radiance signal of band 1 is larger than that of band 2. These measured, and relative, signals in band 1 and band 2 might be adjusted to address a number of other factors, e.g., but not limited to, system cost, system size, S/N requirements, spatial resolution, etc. Advantageously, aspects of the present disclosure calculate a function of these relative signals from band 1 and band 2 that is different for sunlight than it is for man-made thermal sources. Accordingly, in one aspect of the present disclosure, a detector may be provided with a broad band, e.g., a multispectral system such as WorldView, and the other is narrow, e.g., a hyper-spectral system such as AVIRIS. Depending on the relative spectral response of the bands, a man-made thermal feature could have the band 1 value greater than the band 2 value, and the resulting function would still discriminate between the two conditions, i.e., a glint or not a glint. A system is, therefore, provided with a function that processes band 1 and band 2 values to generate a figure of merit (FoM) whose value determines whether or not the observed feature is manmade or a solar glint.

As set forth herein, signals from the different bands are processed to generate the figure of merit (FoM) used to distinguish a glint. In one approach, indices are derived from respective measurements in each of Band1 and Band2. Accordingly, uncalibrated sensors or uncorrected data sets can be used because the indices can be adapted to be independent of the absolute values of radiance and, therefore, take advantage of the slopes of the different radiance curves.

Further, while an aspect of the present disclosure is shown with two filters for explanatory purposes, a system with three filters can be easily implemented by one of ordinary skill in the art and still operate in accordance with the teachings herein. In addition, the size of the bandwidths of the filters need not be same and, in the case of more than two filters, the space between pairs of filters need not be the same either.

Advantageously, a system in accordance with aspects of the present disclosure can implement tactical infrared imaging via an airborne or overhead measurements are taken. Thus, hot targets, e.g., running vehicles, transformers, generators, etc., can be identified during the day. Further, environmental remote sensing of, for example, fires, volcanoes, oil spills, etc., can be implemented as identifying those occurrences also involves distinguishing a glint from a hot target. Still further, aspects of the present disclosure are not limited to airborne and overhead measurements but are also applicable to handheld devices. A handheld device can be used to take temperature measurements outdoors of structures, e.g., heating elements, transformers or surfaces such as steam lines, engines, windows, etc.

Various aspects of the above-described systems and methods may be implemented in digital electronic circuitry, in computer hardware, firmware, and/or software. The implementation can be, for example, a computer program product, i.e., a computer program embodied in a tangible information carrier, a machine-readable storage device to control the operation of data processing apparatus or a programmable processor, a computer and/or multiple computers.

A computer program can be written in any form of programming language, including compiled and/or interpreted languages, and the computer program can be deployed in any form, including as a stand-alone program or as a subroutine, element, and/or other unit suitable for use in a computing environment. A computer program can be deployed to be executed on one computer or on multiple computers at one site.

While the above-described aspects generally depict a computer implemented system employing at least one processor executing program steps out of at least one memory to obtain the functions herein described, it should be recognized that the presently described methods may be implemented via the use of software, firmware or alternatively, implemented as a dedicated hardware solution such as in a field programmable gate array (FPGA) or an application specific integrated circuit (ASIC) or via any other custom hardware implementation.

It is to be understood that the present disclosure has been described using non-limiting detailed descriptions of aspects thereof that are provided by way of example only and are not intended to limit the scope of the disclosure. Features and/or steps described with respect to one aspect may be used with other aspects and not all aspects of the disclosure have all of the features and/or steps shown in a particular figure or described with respect to one of the aspects. Variations of aspects described will occur to persons of skill in the art.

It should be noted that some of the above described aspects include structure, acts or details of structures and acts that may not be essential to the disclosure and which are described as examples. Structure and/or acts described herein are replaceable by equivalents that perform the same function, even if the structure or acts are different, as known in the art, e.g., the use of multiple dedicated devices to carry out at least some of the functions described as being carried out by the processor of the present disclosure. Therefore, the scope of the disclosure is limited only by the elements and limitations as used in the claims.

Whereas many alterations and modifications of the disclosure will no doubt become apparent to a person of ordinary skill in the art after having read the foregoing description, it is to be understood that the particular aspects shown and described by way of illustration are in no way intended to be considered limiting. Further, the subject matter has been described with reference to particular aspects, but variations within the spirit and scope of the disclosure will occur to those skilled in the art. It is noted that the foregoing examples have been provided merely for the purpose of explanation and are in no way to be construed as limiting of the present disclosure.

Although the present disclosure has been described herein with reference to particular means, materials and aspects, the present disclosure is not intended to be limited to the particulars disclosed herein; rather, the present disclosure extends to all functionally equivalent structures, methods and uses, such as are within the scope of the appended claims. Various modifications and changes may be made to the disclosed implementations by persons skilled in the art without departing from the scope of the present disclosure.

What is claimed is:

1. A system for distinguishing a solar glint from a thermal hot spot in an IR image, comprising:
    at least one processor configured to:
        receive a frame of a captured IR image, the frame comprising at least one pixel and associated data, the associated data comprising first and second radiance values (R1, R2) corresponding, respectively, to first and second bands of wavelengths of the IR spectrum; and
        for each at least one pixel in the received frame:
            calculate a figure of merit (FoM) as a function of the first and second radiance values, FoM=f(R1, R2);
            apply a predetermined rule to the calculated figure of merit (FoM) to identify the pixel as a solar glint or a thermal hot spot;
            mark the pixel as one of a solar glint or a thermal spot as a result of the application of the predetermined rule; and
            display the pixel in accordance with its mark as a solar glint or a thermal hot spot.

2. The system of claim 1, wherein the at least one processor is further configured to:
    calculate the figure of merit (FoM) as one of:

$FoM=R1-R2$; or $FoM=(R1-R2)/(R1+R2)$, wherein the wavelength values in the first band are less than those in the second band, and
    wherein the predetermined rule identifies the pixel as a solar glint when FoM<0.

3. The system of claim 1, wherein:
    the first and second bandwidth bands do not overlap with one another, and
    wherein one of the first and second bands includes wavelengths where reflected sunlight has a radiance signal greater than a thermal hot spot and the other band includes wavelengths where reflected sunlight has a radiance signal less than a thermal hot spot.

4. The system of claim 3, wherein the first and second bands are separated by a band of wavelengths.

5. The system of claim 1, wherein the first and second bands of wavelengths are adjacent to one another.

6. The system of claim 1, further comprising:
    an IR imaging device, coupled to the at least one processor, configured to provide the captured IR image and associated pixel data.

7. The system of claim 6, wherein the imaging device is configured to measure each of the first and second radiance values (R1, R2) using a same focal plane.

8. The system of claim 6, wherein the IR imaging device comprises:
    an IR camera comprising an IR sensor;
    a first bandpass filter corresponding to the first wavelength band; and
    a second bandpass filter corresponding to the second wavelength band.

9. The system of claim 1, wherein the at least one processor is further configured to:
    determine whether the corresponding pixel is a glint or a hot target as a function of a relationship between a point (R1, R2) and a predetermined boundary line.

10. The system of claim 1, wherein the at least one processor is further configured to:
    compare the point (R1, R2) to a predetermined boundary line B, where the boundary line B has a form of:

$$B = \begin{cases} 1, R1 \le 1 \\ 3.5R1 - 2.5, R1 > 1 \end{cases};$$

and
    if the point (R1, R2) is below the boundary line, the corresponding pixel is a glint, otherwise, it is a hot target, wherein the wavelength values in the first band are less than those in the second band.

11. The system of claim 1, wherein the at least one processor is further configured to:
only calculate the figure of merit (FoM) if at least one of the first and second radiance values is greater than a predetermined threshold.

12. The system of claim 1, wherein the at least one processor is further configured to:
only calculate the figure of merit (FoM) if at least one of the first and second radiance values is greater than a predetermined threshold.

13. A computer-implemented method of distinguishing a solar glint from a thermal hot spot in an IR image, the method comprising:
receiving, at a processor, a frame of a captured IR image, the frame comprising at least one pixel and associated data, the associated data comprising first and second radiance values (R1, R2) corresponding, respectively, to first and second bands of wavelengths of the IR spectrum; and
for each at least one pixel in the received frame:
calculating, using the processor, a figure of merit (FoM) as a function of the first and second radiance values, FoM=f(R1, R2);
applying, using the processor, a predetermined rule to the calculated figure of merit (FoM) to identify the pixel as a solar glint or a thermal hot spot;
marking, using the processor, the pixel as one of a solar glint or a thermal spot as a result of the application of the predetermined rule; and
displaying, using the processor, the pixel in accordance with its mark as a solar glint or a thermal hot spot.

14. The computer-implemented method of claim 13, further comprising:
calculating, using the processor, the figure of merit (FoM) as one of:

$$FoM = R1 - R2; \text{ or}$$

$$FoM = (R1 - R2)/(R1 + R2),$$

wherein the wavelength values in the first band are less than those in the second band, and
wherein the predetermined rule identifies the pixel as a solar glint when SV<0.

15. The computer-implemented method of claim 13, wherein:
the first and second bandwidth bands do not overlap with one another, and
wherein one of the first and second bands includes wavelengths where reflected sunlight has a radiance signal greater than a thermal hot spot and the other band includes wavelengths where reflected sunlight has a radiance signal less than a thermal hot spot.

16. The computer-implemented method of claim 15, wherein the first and second bands are separated by a band of wavelengths.

17. The system of claim 13, wherein the first and second bands of wavelengths are adjacent to one another.

18. The computer-implemented method of claim 13, further comprising:
determining whether the corresponding pixel is a glint or a hot target as a function of a relationship between a point (R1, R2) and a predetermined boundary line.

19. The computer-implemented method of claim 13, further comprising:
comparing, using the processor, the point (R1, R2) to a predetermined boundary line B, where $$B = \begin{cases} 1, & R1 \leq 1 \\ 3.5R1 - 2.5, & R1 > 1 \end{cases};$$

and
if the point (R1, R2) is below the boundary line, the corresponding pixel is a glint, otherwise, it is a hot target,
wherein the wavelength values in the first band are less than those in the second band.

20. The computer-implemented method of claim 13, further comprising:
only calculating the figure of merit (FoM), using the processor, if at least one of the first and second radiance values is greater than a predetermined threshold.

* * * * *